(12) United States Patent
Khandelwal

(10) Patent No.: US 7,739,199 B2
(45) Date of Patent: Jun. 15, 2010

(54) VERIFICATION OF A TESTIMONIAL

(75) Inventor: Harsch Khandelwal, 39 Susan Cr., Kitchener, Ontario (CA) N2A 4A8

(73) Assignee: Harsch Khandelwal, Kitchener (CA)

( * ) Notice: Subject to any disclaimer, the term of this patent is extended or adjusted under 35 U.S.C. 154(b) by 242 days.

(21) Appl. No.: 11/593,641

(22) Filed: Nov. 7, 2006

(65) Prior Publication Data

US 2007/0106620 A1    May 10, 2007

Related U.S. Application Data

(60) Provisional application No. 60/733,805, filed on Nov. 7, 2005.

(51) Int. Cl.
*G06Q 20/00* (2006.01)
(52) U.S. Cl. .............................. 705/78; 705/75; 705/64; 705/80
(58) Field of Classification Search .................. 705/78, 705/64, 75, 80
See application file for complete search history.

(56) References Cited

U.S. PATENT DOCUMENTS

| 2005/0098759 A1* | 5/2005 | Frankenbach et al. ...... 252/8.91 |
| 2005/0229209 A1* | 10/2005 | Hildebolt et al. .............. 725/42 |
| 2006/0122861 A1* | 6/2006 | Scott et al. ...................... 705/1 |
| 2007/0050194 A1* | 3/2007 | Maxey ........................... 705/1 |
| 2009/0164589 A1* | 6/2009 | Shroff et al. ................. 709/206 |

FOREIGN PATENT DOCUMENTS

JP    2002163390 A   *   6/2002

* cited by examiner

*Primary Examiner*—Pierre E Elisca
(74) *Attorney, Agent, or Firm*—Grant Tisdall; Gowling Lafleur Henderson LLP

(57) ABSTRACT

A method for verifying, to a third party, information in a testimonial from a user provided via a network. The method includes, first, providing a means for transmitting website information from a website owner to an administrator. Next, a means is provided for enabling the administrator to verify the website information. A means for transmitting testimonial information to the administrator is also provided. Next, the method provides a means for enabling the administrator to verify the testimonial information. The method also provides a means for displaying predetermined data related to the testimonial information in a preselected manner so that the third party has access to at least a portion of the testimonial information. Finally, the portion is identified as being verified by the administrator, for example using a web seal.

25 Claims, 12 Drawing Sheets

Figure 6

301,302

Testimonial for www.grapevinesurveys.com

"We have found Grapevine invaluable for our Executive MBA program. We are now able to summarize and analyze our student feedback within minutes, rather than the two-weeks it was taking us before we used Grapevine. Grapevine is an excellent tool and we recommend it without hesitation."

*Michael Pearce*
*EMBA Program Director, Richard Ivey School of Business*
*www.ivey.ca*
*London, Ontario*
*Canada*

320

Verification Steps

| Action | Initiated | Completed |
|---|---|---|
| Proof of Purchase | Feb 8, 2006 | Feb 9, 2006 |
| Consumer Review | Feb 8, 2006 | Feb 8, 2006 |
| Merchant Review | Feb 8, 2006 | Feb 9, 2006 |
| Phone Verification | Feb 9, 2006 | Feb 16, 2006 |

Go Back

Figure 7

Simply insert the code below into your web page to display a Trusted Testimonials click-through seal.

```
<script language="javascript"
src="//www.trustedtestimonials.com/siteseal.js.php?id=23432492"></script>
```

Figure 9

Trusted Testimonials for:

http://www.grapevinesurveys.com

Online Survey Software

Grapevine's online survey software allows you to produce online surveys in order to gather and analyze feedback.

"We have found Grapevine invaluable for our Executive MBA program. We are now able to summarize and analyze our student feedback within minutes, rather than the two-weeks it was taking us before we used Grapevine. Grapevine is an excellent tool and we recommend it without hesitation."
Click for proof ———— 372

*Michael Pearce*
*EMBA Program Director, Richard Ivey School of Business*

VERIFICATION OF A TESTIMONIAL

This application claims the benefit of US Provisional Application No. 60/733,805, filed Nov. 7, 2005, in its entirety herein incorporated by reference.

FIELD OF THE INVENTION

The present invention is related to information provided for company products including wares and services.

BACKGROUND OF THE INVENTION

Currently, website owners often post testimonials on their websites. For example, a website owner may include statements which are said to be provided by satisfied customers, as well as statements from experts, celebrities, associations, etc. These statements are testimonials—i.e., they testify as to the merits of the products or services provided by the website owner.

Testimonials are posted because they are thought to be persuasive. However, the effectiveness of testimonials is undermined by widespread scepticism about testimonials. Often, testimonials are assumed not to be genuine, and testimonials generally are not as effective as they could be, if the veracity of the testimonials could conveniently be trusted by a visitor to the website. Further problems with state of the art testimonial presentation methods Include the lack of available information concerning verification methodology of testimonials, as well as the ability to access testimonials related specifically to a company product and/or a company in general.

SUMMARY OF THE INVENTION

The systems and methods disclosed herein provide for a customer to readily verify a testimonial related to a company product and to obviate or mitigate at least some of the above presented disadvantages.

Often, testimonials are assumed not to be genuine, and testimonials generally are not as effective as they could be, if the veracity of the testimonials could conveniently be trusted by a visitor to the website. Further problems with state of the art testimonial presentation methods include the lack of available information concerning verification methodology of testimonials, as well as the ability to access testimonials related specifically to a company product and/or a company in general. Contrary to present testimonial presentment methods there is provided a system and method for providing verified testimonial information of a company product for access by a customer over a communications network. The verified testimonial information is configured for affirming desirability of the product by one or more customers. The system and method include confirming the authenticity of the testimonial data for Inclusion in the verified testimonial information, either first or third hand. The system and method also include receiving a request for the verified testimonial information, such that the request is associated with one or both of a company name related to the product or the product name. The system and method also include generating the verified testimonial information to include the testimonial data and an identification portion identifying the verified authenticity of the testimonial data, such that the verified testimonial information is communicated in response to the received request.

According to one aspect there is provided a method for providing verified testimonial information of a company product for access by a customer over a communications network, the verified testimonial information configured for affirming desirability of the product by one or more customers, the method comprising the acts of: confirming the authenticity of the testimonial data for inclusion in the verified testimonial information; receiving a request for the verified testimonial information, the request Including identifying one or both of a company name related to the product or the product; generating the verified testimonial information to include the testimonial data and an identification portion identifying the verified authenticity of the testimonial data; and communicating the verified testimonial information in response to the received request.

A further aspect provided is a system for providing verified testimonial information of a company product for access by a customer over a communications network, the verified testimonial information configured for affirming desirability of the product by one or more customers, the system comprising: a verification module for confirming the authenticity of the testimonial data for inclusion in the verified testimonial information; a data module for receiving a request for the verified testimonial information, the request including identifying one or both of a company name related to the product or the product; a testimonial module generating the verified testimonial information to include the testimonial data and an identification portion identifying the verified authenticity of the testimonial data; and for communicating the verified testimonial information in response to the received request.

A still further aspect provided is a computer program product for providing verified testimonial information of a company product for access by a customer over a communications network, the verified testimonial information configured for affirming desirability of the product by one or more customers, the computer program product comprising: a computer readable medium; a verification module stored on the computer readable medium for confirming the authenticity of the testimonial data for inclusion in the verified testimonial information; a data module stored on the computer readable medium for receiving a request for the verified testimonial information, the request including identifying one or both of a company name related to the product or the product; a testimonial module stored on the computer readable medium for generating the verified testimonial information to include the testimonial data and an identification portion identifying the verified authenticity of the testimonial data; and for communicating the verified testimonial information in response to the received request.

BRIEF DESCRIPTION OF THE DRAWINGS

Exemplary embodiments of the invention will now be described in conjunction with the following drawings, by way of example only, in which:

FIG. 6 is a company website of FIG. 1 showing an example verified testimonial information;

FIG. 7 shows verified data of the testimonial data of FIG. 5;

FIG. 8 shows example code for facilitating inclusion of the verified testimonial information of FIG. 6 with company products;

FIG. 9 gives example web seals of the system of FIG. 1;

FIG. 10 gives further example web seals of the system of FIG. 1;

DETAILED DESCRIPTION OF THE PREFERRED EMBODIMENT(S)

Network 10

Figure 1:
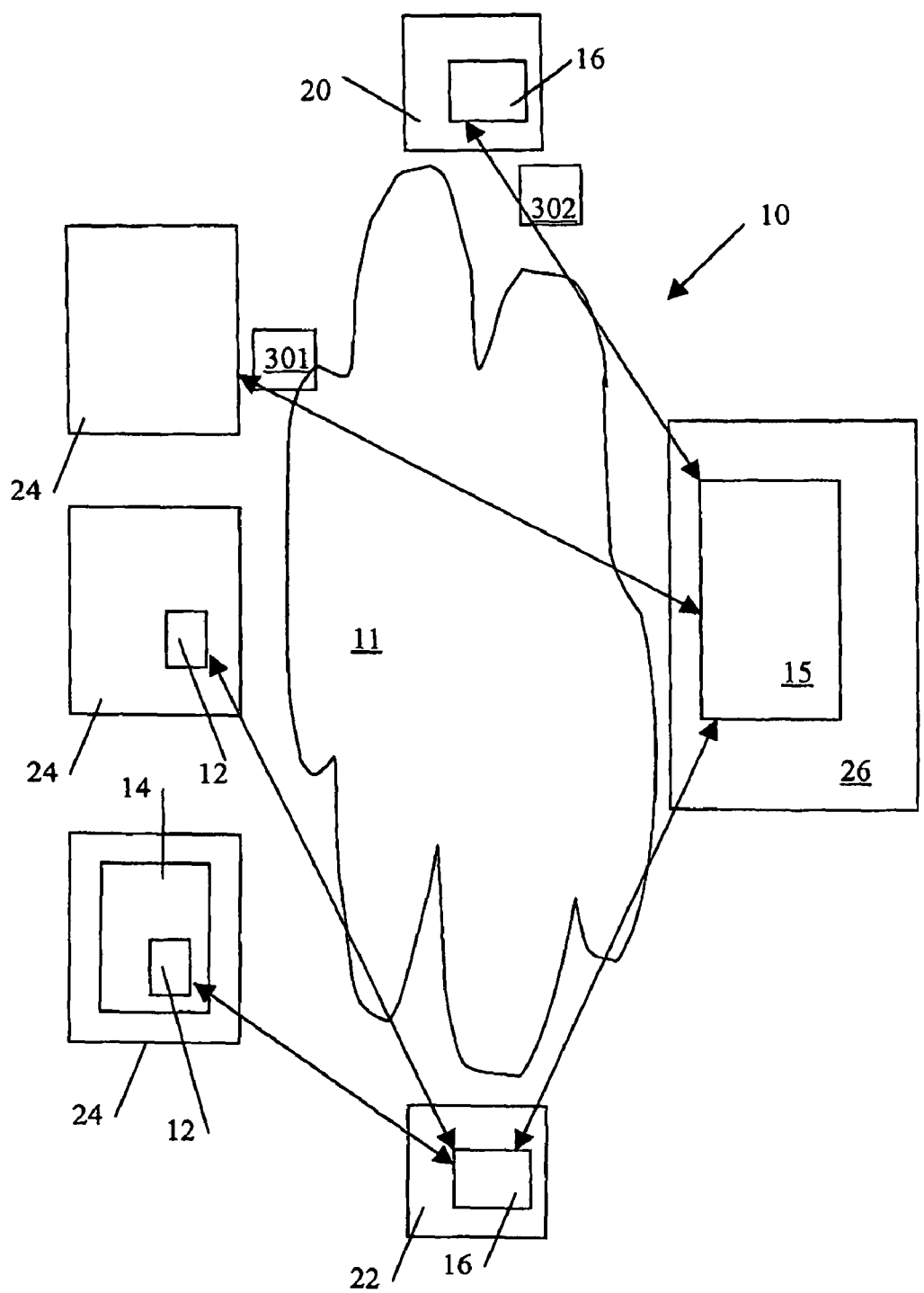
FIG. 1 is a block diagram of components of a testimonial verification system.

Referring to FIG. 1, shown is a testimonial verification network system 10 for facilitating access by a customer client computing device 22 (hereafter referred to as customer 22) to verified testimonial information 12 (see FIG. 6) available via a company server computing device 24 (hereafter referred to as company 24), for example. Testimonial data 301 can be initially supplied by a testimonial provider 20 (e.g. using a computing device) to a testimonial administration system 26 (comprising one or more computing devices), which is responsible for generating the verified testimonial information 12 that is subsequently made available to the customer 22. The veracity of the testimonial information 12 can be verifiable or otherwise confirmed by the customer 22 when communicating with the company 24 using a variety of different communication modes 30, as further described below. The computing devices of the testimonial provider 20, the customer 22, the company 24, and the testimonial administration system 26 are enabled for communication via a communications network 11, such as the Internet. The network system 10 can include multiple testimonial providers 20, multiple customers 22, one or more companies 24, one or more respective testimonial administration systems 26 and one or more coupled communication networks 11, as desired.

Testimonial Information 12

The verified testimonial information 12 is used to provide something (e.g. a writing, photo/picture, video, audio and/or certificate image) that recommends or otherwise expresses commendation/testimony in favour of a product of the company 24 as worthy and/or desirable, as further described below. Accordingly, the testimonial information 12 can be configured for affirming the value/desirability (actual or potential) of the product to the customer 22, e.g. for extolling the virtue of the product, and is used in the promotion and advertising of that product. It is also recognised that the testimonial Information 12 could also be referred to as an endorsement, as desired.

In one embodiment, the verified testimonial information 12 provided by the testimonial administration system 26 Includes details such as, for example, the testimonial provider's 20 comments regarding the company 24 product(s) (e.g. goods and/or services) in question, the testimonial provider's 20 name and contact information, in the case of business to business (B2B) interactions the company name and position of testimonial provider 20 can be included, whether or not the company 24 product(s) were purchased by the testimonial provider 20 (and if so, proof of purchase), and whether there is any relationship (family, business, or otherwise) between the testimonial provider 20 and the company 24. It is recognised that the verified testimonial information 12 could be made available on the company 24 server computing device through hosted website 14 content associated with the company's products, as desired, such that the client computing device of the customer 22 accordingly uses an application 16 such as a browser to communicate with the website 14.

Accordingly, the above described details (as well as others described below) of the testimonial information 12 (obtained from the testimonial data 301) can be used to verify the origin of the testimonial data 301 supplied in the testimonial information 12 that is made available to the customer 22.

Testimonial Provider 20

It will be understood that for the purposes hereof, the testimonial provider 20 may be any user (i.e. first hand product experience), or acquaintance of any user (i.e. second hand product experience), of company 24 products (e.g. goods and/or services) to which the verified testimonial information 12 will be directed to. For example, the testimonial provider 20 may be an individual who purchases goods and/or services for personal use, and not for resale or for use in the production of other goods and/or services for resale. Or the testimonial provider 20 may be a business purchasing goods and/or services for use in its business, i.e., for resale or for use in the production of other goods and/or services for resale, and/or experts, celebrities, associations etc. providing testimonials on behalf of the company 24. Further, it is recognised that the testimonial provider 20 may not have purchased the goods and/or services. For example, the testimonial provider 20 may have acquired the goods and/or services pursuant to a free trial offered by the website owner (e.g. company 24). The basis on which the testimonial provider 20 acquired the goods and/or services can be important information for providing to the administrator system 26 in the testimonial data 301, and which is preferably included as part of the confirmation/verification process provided by the verification module 304, described further below.

Company 22 Products

In economics, economic output is divided into goods and services. When an economic activity yields a valuable or useful thing, it can be known as production output of the totality of products (e.g. goods or services) in an economy that the company 24 makes available for use by the customers 22. Products as goods can range from a simple safety pin, food, clothing, computer components to complex aircraft. Products as services are the performance of any duties or work for another (e.g. helpful or professional activity) and can be used to define intangible specialized economic activities such as but not limited to: providing access to specific information; web services; transport; banking; legal advice; accounting advice; management consultant advice; and medical services. The company 24 providing the products can be a businessperson/individual engaged in wholesale/retail trade, an organization, an administration, and/or a business that sells, administers, maintains, charges for or otherwise makes available product(s) that are desirable by the customers 22. Accordingly, the company 24 can be one person, or an association of persons, for the purpose of carrying on some enterprise or business; a corporation; a firm; etc. Further, it is recognised that the use of the verified testimonial information 12 can be applied to company 24 activities not related to specific product(s), for example activities such as customer service, community activities, and/or sponsorships. These general activities of the company 24 are also considered as part of the definition of company 24 products.

Further, it is recognised that a first company's 24 products (e.g. information) may be ultimately financed: by only the interest (e.g. website traffic via links) shown by the customer 22 in the products; through direct purchase by the customer 22 of the company's products; and/or through interest/purchase by the customer 22 of products of a third party company 24 via advertising (e.g. on-line advertisements) associated with the first company's 24 products. One example of the first company 24 is an affiliate promoting (e.g. through on-line advertising with links to the third company 24 products) the products of the third company 24.

Customer 22

It will be understood that for the purposes hereof, the customer 22 may be any user (i.e. first hand product experience) of company 24 products (e.g. goods and/or services). For example, the customer 22 may be an individual who purchases company 24 goods and/or services for personal use, and not for resale or for use in the production of other goods and/or services for resale. Or the customer 22 may be a business purchasing company 24 goods and/or services for use in its business, i.e., for resale or for use in the production of other goods and/or services for resale. Further, it is recognised that customer 22 may not purchase the goods and/or services. For example, the customer 22 may have acquire the goods and/or services pursuant to a free trial offered by the company 24.

Any business or organization can be called an enterprise, while consumers are individuals or households that purchase and use goods and services generated within the economy. It is recognised that both enterprises and consumers can be included in the definition of customers 22.

For example, the definition of B2C (Business-to-Consumer) is used to define the Interaction between a business/company 24 (e.g. enterprise) that sells products or provides services to end-user consumers (e.g. customers 22). Further, for example, Business-to-Business (B2B) can be used to represent for relations between enterprises (e.g. between a business company 24 and a business customer 22), contrary to relations between enterprises and other groups (e.g. customers, public administration). The term B2B can be used to define marketing activities as well as electronic communication relations between enterprises. For example, B2B-Marketing can be used to describe all products and services used by enterprises. B2B marketing can be considered more complex than B2C marketing because on the buyer's side, there can be more than one person involved in a B2B sale/purchase, the buying center.

Accordingly, it is recognised that the customer 22 can be a private individual desiring information/purchase (e.g. B2C) of the company 24 products or can be a person, or an association of persons, for the purpose of carrying on some enterprise or business (e.g. a corporation, a firm, etc.) that desires information/purchase (e.g. B2B) of the company 24 products. It is recognised that the customer 22 can communicate with the company 24 as a potential purchaser (i.e. window shopping) or as an intended purchaser of the company's 24 products, as desired.

Testimonial Administration System 26

Figure 3:
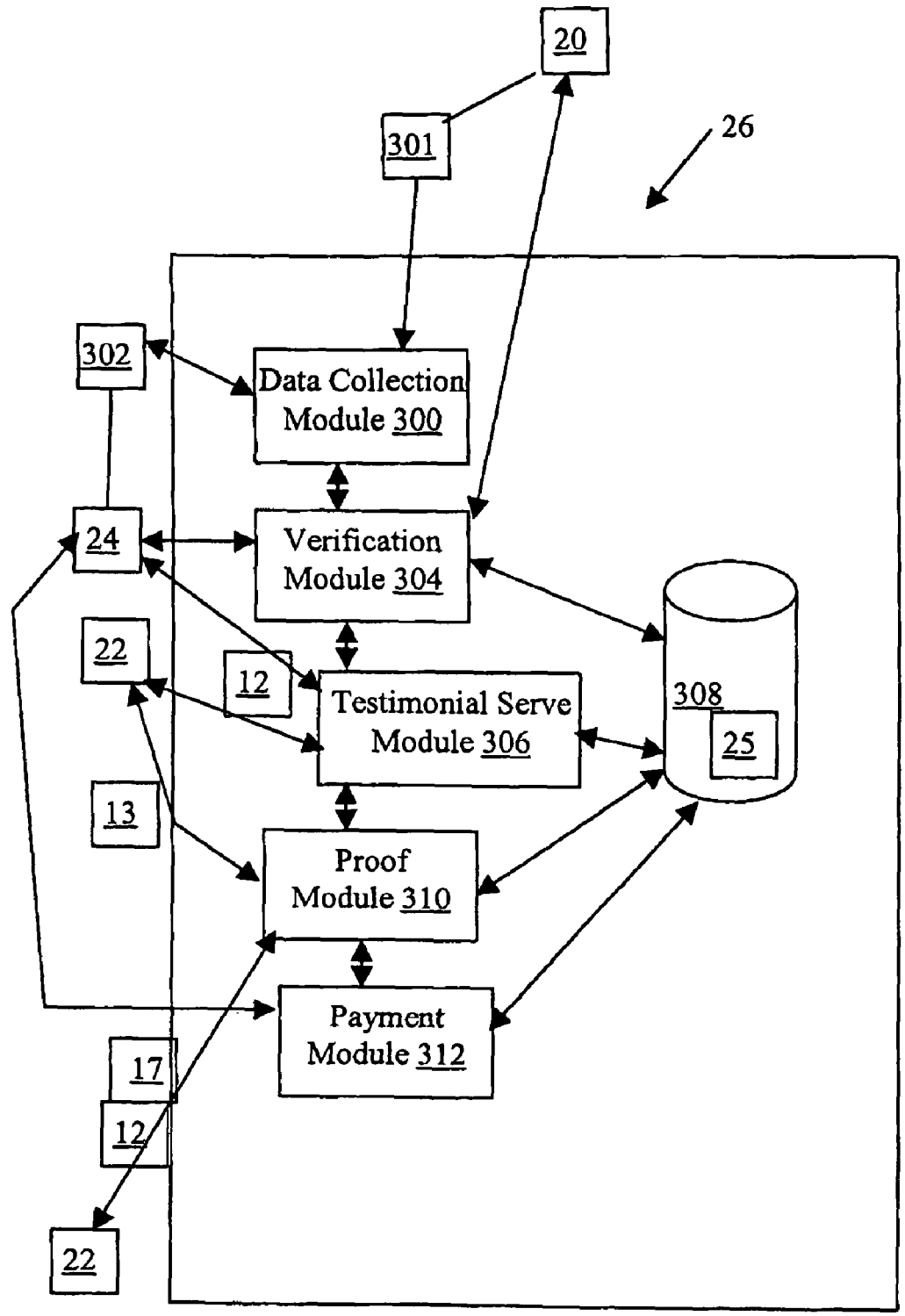
FIG. 3 is a block diagram of a testimonial administration system of FIG. 1.

Referring to FIG. 3, the testimonial administration system 26 includes a data collection module 300 for receiving testimonial data 301 collected from the testimonial provider 20 and company data 302 concerning the company 24. The received testimonial data 301 and company data 302 are confirmed by a verification module 304, as to the authenticity of the data 301, 302. Once verified, the data 301, 302 is stored in the memory 308 for subsequent use by a testimonial server module 306 for generating the verified testimonial information 12 and/or serving up the verified testimonial information 12 to the customer 22 upon request, as further described below. The system 26 also has a proof presentation module 310 for providing the customer 22 with access to the testimonial data 301 and company data 302, additional testimonial information 13 that is related to the verified testimonial information 12, as further described below. In one embodiment, the verified testimonial information 12 is a subset of the total data represented by the testimonial data 301 and company data 302. As well, the system 26 can have a payment module 312 that provides for generation of billing and collection of amounts owing from the company 24, in view of the degree of activity by the customer 22 with respect to interaction with the verified testimonial information 12 (as well as testimonial information 13 and web seals 362 further described below). The data associated with the billing process (e.g. billing amounts, company account status, etc.) can be stored in the database 308, as desired. It is recognised that any of the above described modules 300, 304, 306, 310, 312 can be implemented separately as described, further subdivided into additional modules, and/or combined into the same module, as desired, (e.g. the data collection module 300 and the verification module 304 would be combined and implemented as one module).

Computing Devices 101

Figure 2:
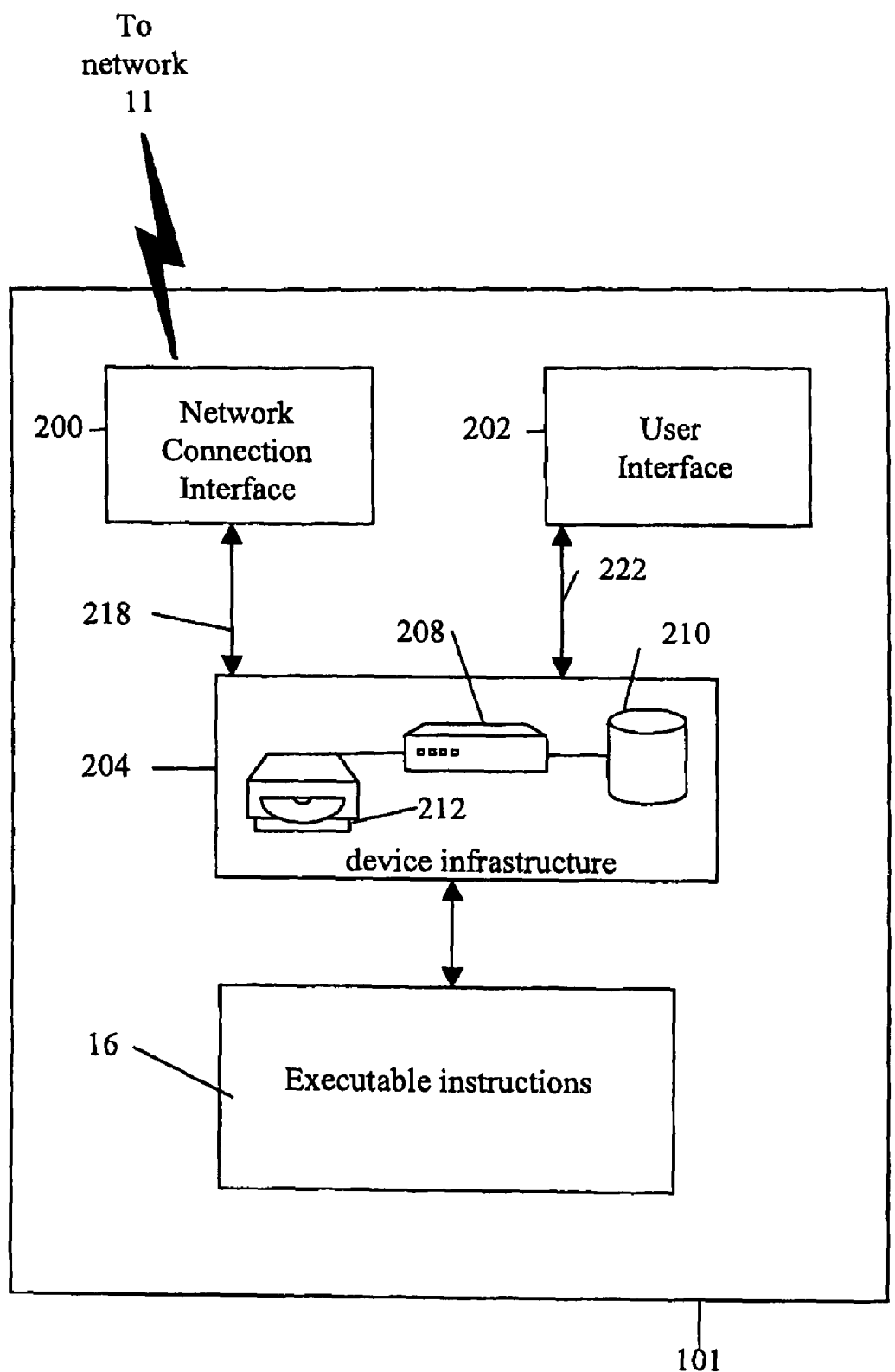
FIG. 2 is a block diagram of an example computing device for implementing the components of FIG. 1.

Referring to FIGS. 1, 2 and 3, each of the above-described testimonial providers 20, customers 22, companies 24, and testimonial administration systems 26 can be Implemented on one or more respective computing device(s) 101. The devices 101 in general can include a network connection interface 200, such as a network interface card or a modem, coupled via connection 218 to a device infrastructure 204. The connection interface 200 is connectable during operation of the devices 101 to the network 11 (e.g. an intranet and/or an extranet such as the Internet), which enables the devices 101 to communicate with each other as appropriate. The network 11 supports the communication of the data 301,302 between the administration system 26 and the testimonial providers 20 and companies 24, as well as providing the verified testimonial information 12 from the administration system 26 to the companies 24 (and/or directly to the customers 22) as desired. Further, the network 11 also supports the communication of the data 301,302 between the administration system 26 and the customers 22, as well as additional Information 13, as further described below.

Referring again to FIG. 2, the devices 101 can also have a user interface 202, coupled to the device infrastructure 204 by connection 222, to interact with a user (e.g. company 24, provider 20, customer 22, etc.). The user interface 202 can include one or more user input devices such as but not limited to a QWERTY keyboard, a keypad, a track wheel, a stylus, a mouse, a microphone and the user output device such as an LCD screen display and/or a speaker. If the screen is touch sensitive, then the display can also be used as the user input device as controlled by the device infrastructure 204. For example, the user Interface 202 for the devices 101 used by the customers 22 can be configured to interact with the customers' 22 web browsers (applications 16) to access the verified testimonial information 12 available on the websites 14 of the companies 24, as well as to access the data 301,302 as additional information 13 available through the proof presentation module 310, as further described below. For the devices 101 used by the testimonial providers 20, the user interfaces 202 can be used to access the administration system 26 (e.g. via a website 15) to provide the testimonial data 301, as further described below. For the devices 101 used by the companies 24, the user interfaces 202 can be used to access the administration system 26 (e.g. via the website 15) to provide the company data 302, as further described below.

Referring again to FIG. 2, operation of the device 101 is facilitated by the device infrastructure 204. The device Infrastructure 204 includes one or more computer processors 208 and can include an associated memory 210 (e.g. a random access memory). The computer processor 208 facilitates performance of the device 101 configured for the intended task (e.g. testimonial provider 20, customer 22, company 24, administration system 26) through operation of the network Interface 200, the user interface 202 and other application programs/hardware of the device 101 by executing task related instructions, These task related Instructions can be provided by an operating system, and/or software applications 16 located in the memory 210, and/or by operability that is configured into the electronic/digital circuitry of the processor(s) 208 designed to perform the specific task(s). Further, it is recognized that the device infrastructure 204 can include a computer readable storage medium 212 coupled to the processor 208 for providing instructions to the processor 208 and/or to load/update client applications 16. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Further, it is recognized that the computing devices 101 can include the executable applications 16 comprising code or machine readable instructions for implementing predetermined functions/operations including those of an operating system, a web browser, the data 301,302 collection/processing, and verified testimonial information 12 processing system(s), for example, in response to user command or input. The processor 208 as used herein is a configured device and/or set of machine-readable instructions for performing operations as described by example above. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality (e.g. modules 300, 304, 306, 310, 312) provided by the systems and process of FIGS. 1,2,3 may be implemented in hardware, software or a combination of both. Accordingly, the use of a processor 208 as a device and/or as a set of machine readable instructions is hereafter referred to generically as a processor/module for sake of simplicity. Further, it is recognised that the administration system 26 can include one or more of the computing devices 301 (comprising hardware and/or software) for Implementing the modules 300, 304, 306, 310, 312, as desired.

It will be understood that the customer 22 client computing devices 301 may be, for example, personal computers, personal digital assistants, mobile phones, and content players. Server computing devices 101 (e.g. for the administration system 26 and/or the companies 24) may additionally include a secondary storage element such as the memory 308 (e.g. database). Each server, although depicted as a single computer system, may be implemented as a network of computer processors, as desired.

Components of The Testimonial Administration System 26

Data Collection Module 300

Referring again to FIG. 3, the administration system 26 is operated and managed by an administrator (not shown). The data collection module 300 is configured to receive the data 302 from the company 24 (e.g. via the company computing device 101—see FIG. 2) in order to set-up the company 24 for desired association of verified testimonial information 12 with the company's products, using for example a communication mode 350 (see FIG. 4). It is recognised that the communication mode 350 can represent direct communication between the company 24 and the administration system 26 (either over the communication network 11 or by other means—e.g. conventional mail). Further, it is recognised that the communication mode 350 over the network 11 can include communication such as but not limited to: voice communication via phone; written communication (with or without included audio/video and image components) via network messaging (e.g. email, facsimile); and/or others as desired. Further, it is recognised that any of the data 302 received from the company 24 can also be included as part of the testimonial data 301 and verified accordingly for use in the testimonial information 12,13 and/or web seals 362, as further discussed below.

In one embodiment, the company data 302 can come from the company 24 operating as a website owner. The company 24 uses the company computing device 101, for example, to submit company and Website information. The company information can include information such as but not limited to: company phone number; company facsimile number; physical address; email address; and other company materials (product information including product categories and/or product marketing information). The Website Information can include Information such as but not limited to: the Website's URL(s) (uniform resource locator, also known as universal resource locator); affiliate URL(s); the Website name; and contact information (phone, email, address) for the Website as well as information for the website's administrator. Preferably, the company and/or Website information is transmitted to (or otherwise requested from) the data collection module 300 over the network 11. The company information 302 communicated between the collection module 300 and the company 24 can include terms on which the administrator of the administration system 26 is to provide the testimonial verification services requested by company 24, set out in a written contract as desired. It is recognised that the Website information and/or the written contract can be considered as a subset of the company information included in the company data 302.

Figure 4:
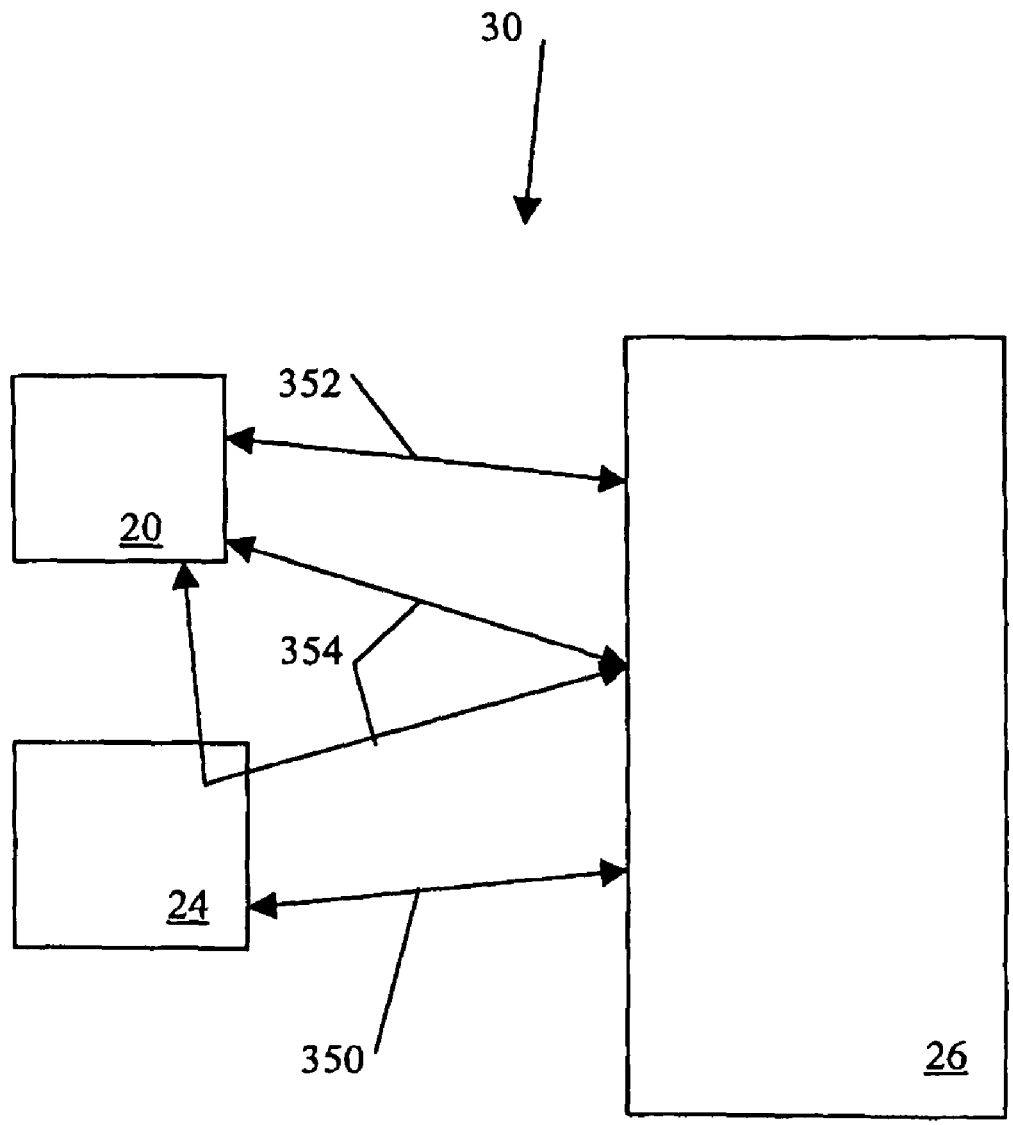
FIG. 4 shows example communication modes between the components of FIG. 1.

Referring again to FIG. 3, the data collection module 300 also facilitates collection of the testimonial provider data 301 from the testimonial provider 20 (e.g. via the provider computing device 101—see FIG. 2) in order to generate verified testimonial information 12 for association with the company's 24 products, using for example communication modes 352 and/or 354 (see FIG. 4). It is recognised that the communication mode 352 can represent direct communication (either over the communication network 11 or by other communication means—e.g. conventional mail) between the testimonial provider 20 and the administration system 26. It is recognised that the communication mode 354 can represent indirect communication (either over the communication network 11 or by other communication means—e.g. conventional mail) between the testimonial provider 20 and the administration system 26 via the company 24, such that the company 24 (i.e., a website owner whose Website Information has been verified) submits the testimonial data 301 to the administrator system 26 on behalf of the testimonial provider 20.

Further, it is recognised that the communication modes 352,354 over the network 11 can include communication such as but not limited to: voice communication via phone; written communication (with or without included audio/video and image components) via network messaging (e.g. email, facsimile); and/or others as desired. In particular, voice communication over phone can include an IVR (short for interactive voice response) system, for example, in which the testimonial provider 20 uses a touch-tone telephone (and/or possibly using voice activated commands) to interact with the administration system 26 (and for example the database 308) to provide the testimonial data 301. It is recognised that IVR technology may not require human interaction over the telephone as the testimonial provider's 20 interaction with the administration system 26 would be predetermined by what the IVR system would allow the testimonial provider 20 access to. For example, the IVR can be used to prompt the testimonial provider 20 to answer questions by speaking directly into the handset or pushing the numbers on a touch-tone telephone (e.g. computing device 101) connected via the network 11 to the administration system 26.

In one embodiment, the testimonial data 301 can be a testimonial for the website owner (e.g. company 24) whose Website Information has been verified, as further described below. The testimonial data 301 can be submitted using any suitable client device (e.g. testimonial provider device 101). The testimonial data 301 can include information such as but not limited to: comments regarding the company 24 product(s) (e.g. goods and/or services) in question, including personal/third party experiences with the company 24 product(s); name and contact information (e.g. phone number, address, email address, etc.) of the testimonial provider 20, whether or not the company product(s) and/or the manner in which the company product(s) were purchased by the testimonial provider 20 (and if so, proof of purchase); and any relationship (e.g. personal, family, business, or otherwise) between the testimonial provider 20 and the company 24, as well as company name and position for B2B cases. Preferably, the testimonial data 301 is transmitted to the data collection module 300 over the network 11, as desired. It is recognised that the testimonial data 301 can include audio, video, image, and/or written information (suitable for use in generation of the verified testimonial information 12), as desired.

It is recognised that the verified testimonial Information 12 and/or the additional information 13 can include details (names, pictures, addresses, purchase information, product experience) on past customers 22 who have provided customer data to the company 24 outside of and/or though the data collection module 300, however accessible through the memory 308 or other third party memory 308. For example, the information 12,13 can include the number of customers that have purchased the product(s) in the past year (or other specified time period), as well as other demographic information that may typify the type of customer that purchased the product(s). This more generic product information may also be verifiable through the administration system 26, as desired.

Figure 5:
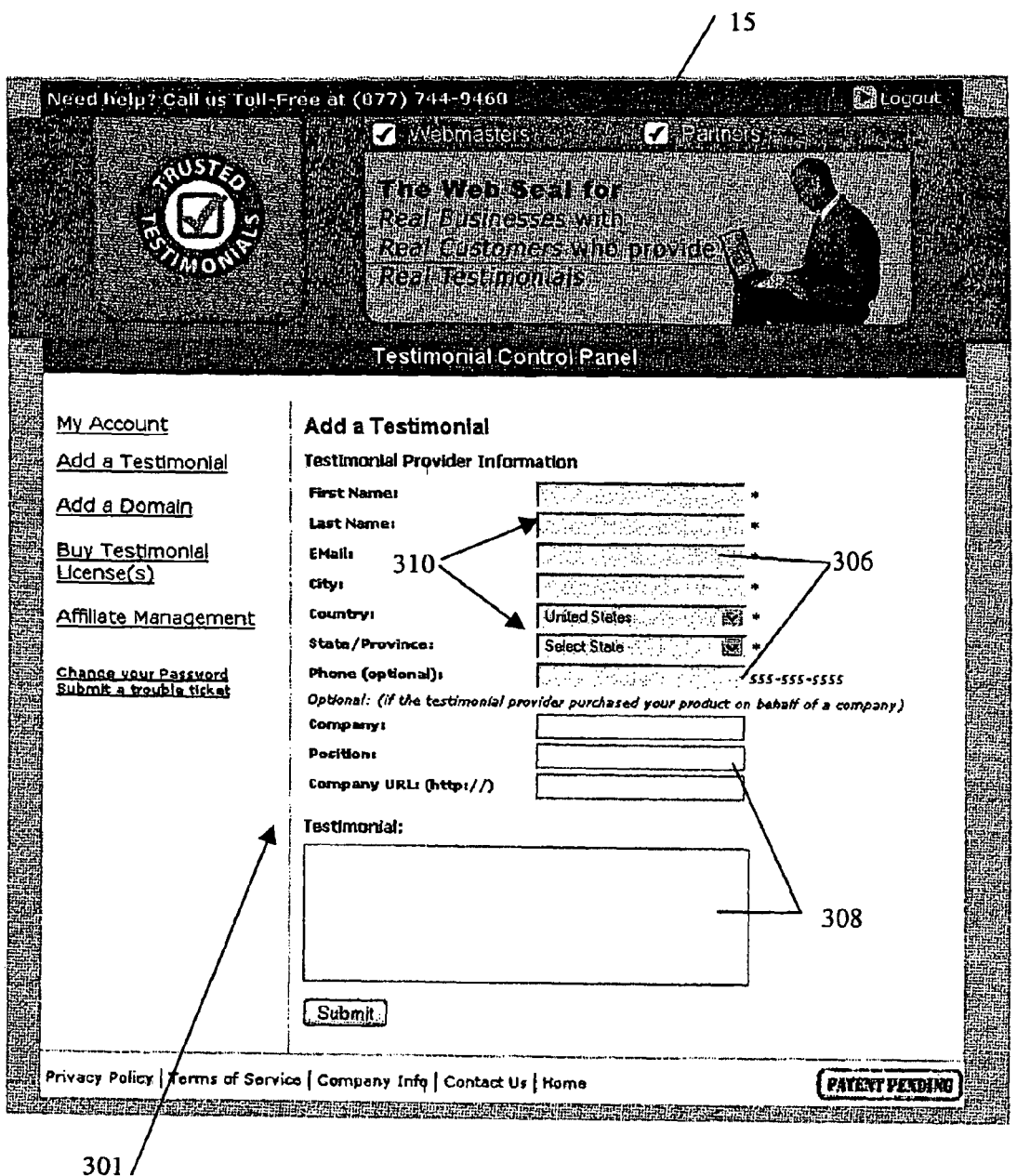
FIG. 5 is an example embodiment of testimonial data of the system of FIG. 3.

Referring to FIG. 5, shown is an example of testimonial data 301 provided by the testimonial provider 20. This example shows the website 15 of the administration system 26 being used to facilitate collection of the testimonial data 301, including contact information 306, testimonial statements 308, and personal information 310. It Is recognised that the testimonial statements 308 can include audio, video, image, and/or written information (suitable for use in generation of the verified testimonial information 12), as desired. For example, the testimonial provider 20 can include in the testimonial data 301 information such as but not limited to: upload of an Image of their company logo or a photo/picture of themselves; upload of an audio clip of the testimony (or recorded during the phone/voice verification described below); enter details of product purchased or otherwise experienced; price paid and date of transaction/experience; upload of a scanned copy of proof of purchase (or fax it In); which class of testimony is being provided (customer service, product/service, etc); product category (e.g. children's toy, personal use, business use, service as compared to goods, etc.); and/or rating(s) (e.g. on a scale of 1 to 5 along pre-defined dimensions) based on class of testimony (or one global rating from 1 to 5 for example).

Verification Module 304

Referring again to FIG. 3, the administration system 26 also has the verification module 304 for verifying the data 301,302 received via the data collection module 300, such that any of the verified data 301,301 has the potential of being included in the verified testimonial information 12 and the additional information 13, as desired. This verification process as implemented by the verification module 304 can include electronically (e.g. via the network 11) or otherwise contacting and confirming the testimonial provider 20 specified to confirm the validity of the testimonial data 301, as well as to contact the company 24 to confirm the validity of the company data 302, as described by example below. It is also recognized that the form of proof offered by the testimonial provider 20 and/or company 24 for verification of the respective data 301,302 can also be included in verification data 32Q, further described below.

The verification module 304 can confirm the authenticity of the company data 302 by methods including such as but not limited to: issuing a confirmation email to an address associated with the company (e.g. website's domain) and/or checking the address data against a company 24 database directory or series of directories (e.g. third party supplied—not shown) available via the connected network 11. One example of the company 24 directory could be a company 24 listing available on-line that provides company 24 address, contact, and product details. Further, the verification module 304 may facilitate verification of a telephone number provided by the company 24 by telephoning the telephone number (e.g. manually or in an automated fashion). Or, to confirm an address, the company 24 may provide (or be prompted to provide) a copy of a utility bill for its premises, e.g., by facsimile transmission or otherwise, or other suitable documentation showing proof of company 24 address as specified in the company data 302. It is recognised that the data 302 verification can be done automatically and/or manually (by a user of the administration system computing device 101), as facilitated by the verification module 304. Details of the verification process concerning the company data 302 can be stored in the memory 308 as verification data 320 along with the company data 302, as desired.

The verification module 304 can confirm the authenticity of the testimonial data 301 by methods including such as but not limited to: issuing a confirmation email to the address specified for the testimonial provider 20 or checking the data against an individual 20 database directory or series of directories (e.g. third party supplied—not shown) available via the connected network 11. One example of the individual 20 directory would be an on-line personal directory listing peoples' names and addresses and telephone numbers. Further, the administrator may verify a telephone number provided by the testimonial provider 20 by telephoning the telephone number. Or, to confirm the testimonial provider's 20 address, the testimonial provider 20 may provide a copy of a utility bill for the testimonial provider's 20 premises, by facsimile transmission or otherwise, or other suitable documentation showing proof of testimonial provider 20 address as specified in the testimonial data 301. It is recognised that the data 301 verification can be done automatically and/or manually (by a user of the administration system computing device 101), as facilitated by the verification module 304. Details of the verification process concerning the testimonial data 301 can be stored in the memory 308 as the verification data 320 along with the testimonial data 301, as desired.

Further, the phone/voice verification for the data 301,302 can be done manually or via an automated service. For example, the testimonial provider 20 can enter their phone number in the control panel of the website 15 (see FIG. 5) and the verification module 304 would implement a call to the testimonial provider 20 (for example during the same session between the testimonial provider 20 and the website 15). The website 15 then displays a unique identifier (e.g. a PIN number) which the testimonial provider 20 then says and/or enters Into the phone and/or website 15, respectively, when they take the call. For example, the system can either call and display a PIN number on the website 15 which the user has to say or enter into the phone OR a PIN number can be mentioned over the phone which must be entered on the website 15. The verification system 304 can also facilitate recording of the conversation with the testimonial provider 20, and/or whether the conversation was manually conducted or not, and store In the memory 308 as verification data 320 for further verification proof of the testimonial data 301 (similar can be done for the company data 302). Accordingly, it is recognised that the verification process itself can be stored as the verification data 320 in the memory 308 with the other data 301,302 once verified (see FIG. 7).

It is recognised that in some cases manual verification may be required to check, for example, the authenticity of a receipt (electronic or otherwise) for the company 24 product for which the testimonial data 301 is being provided. It is further recognised that the verification module 304 can be used in conjunction with operation of the data collection module 300 during the communication of the data 301,302 via the communication modes 350, 352, 354 as desired. It is also considered that implementation of the modules 300,304 could be combined as a common interactive Interface (e.g. website 15) provided to the company 24 and/or testimonial provider 22.

Testimonial Server Module 306

Referring again to FIG. 3, the administration system 26 also has a testimonial server module 306 for supplying/transmitting the verified testimonial information 12 to the customer 22. In one embodiment, the verified testimonial information 12 is a subset of the total verified data of the testimonial data 301, the company data 302, and the verified information 320 available in the memory 308. In general, the module 306 can be responsible for processing any requests for the verified testimonial information 12,13 (and web seals 362) (e.g. the requests can include identification of the company 24 name and/or specific product name or other identification data) in order to generate the specific verified testimonial information 12,13 (and web seals 362) from the stored data 12, 13, 320. The module 306 can also serve or otherwise make available the generated testimonial information 12,13 (and web seals 362) to the customer 22 (or via the company 24) as desired.

The testimonial server module 306 generates the verified testimonial information 12 based on the verified data 301,302 (and verification data 320) available in the memory 308 (see FIG. 7), for example. The generation of the verified testimonial information 12, including the content and/or the presentation format, is facilitated by agreement (e.g. written contract) between the company 24 and the administration system 26, for example. Accordingly, the written contract would specify which portions of the company data 302 and testimonial provider data 301 are to be included in the verified testimonial information12, Initially presented to the customer 22, as well as any additional testimonial information 13 to be provided by the proof presentation module 310 (for example), further described below. Further, it should be noted that the testimonial provider 20 can also specify which testimonial data 301 can and cannot be made public (e.g. provided publicly as testimonial information 12,13). Also considered is that the testimonial provider 20 can enter into a similar written contract which clears/allows the website 14 to use at least some of the testimonial data 301 as the available testimonial information 12,13. Accordingly, the testimonial information 12,13 can be divided Into different information subsets, some of which are available for presentation to the customer and some of which are restricted (not available to the customer 22).

Figure 6:
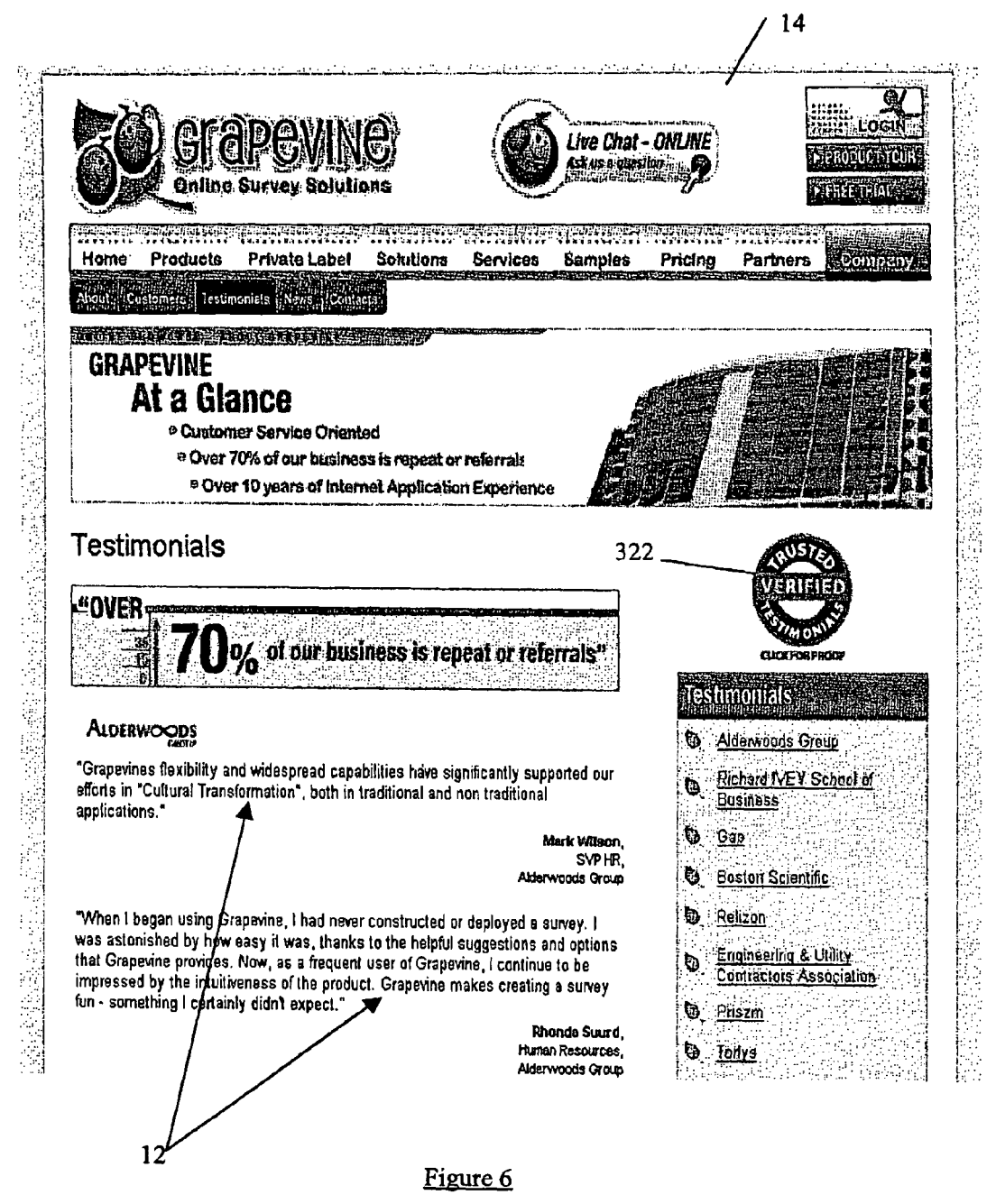

Referring to FIG. 6, example verified testimonial information 12 is shown, in this case posted by the testimonial server module 306 to the website 14 of the company 24 In response to a webpage request via the web browser application 16 of the customer 22. It is recognised that the testimonial server module 306 may submit the verified testimonial information 12 to the company 24 for presentation on the company's website 14, or on any other selected/associated website (not shown) as desired. When so provided, the verified testimonial information 12 can include a verified indication 322 (e.g. statement and/or indicia) indicating that the testimonials are provided directly by the administrator system 26 (along with a date/timestamp or other temporal indicator). For example, some web seals 362 have date stamps on them to identify websites that may try to counterfeit the web seals 362, as the counterfeited web seals 362 would not have the updated temporal indicator automatically. It is recognised that the testimonial information 12,13 and/or web seals 362 may include the indicia/indication 322 for indicating the authenticity of the testimonial information 12,13 and/or web seal 362, such as a date/time stamp of when the testimonial information 12,13, and/or web seal 362 was issued, a digital signature corresponding to the administration system 26, or other indicia 322 as desired. The indicia/indication 322 may also include an electronic link for directing the customer 22 directly to the administration system 26 when activated, as desired.

The verified testimonial information 12 may also include third party advertising messages (e.g. from the company 24 or from other companies 24) when displayed/communicated to the customer 22, as desired. It is also recognised that a graphical Image can be provided to the customer 22 (e.g. displayed on the company website 14) indicating that the testimonials have been verified by the administrator system 26. It is also recognised that the verified testimonial information 12 may include any subset of the data 301,302,320 information collected, including playback controls for playing, pausing forwarding/rewinding and stopping audio/video clips.

Referring to FIG. 8, shown is an example series of coded instructions (e.g. script) for insertion in the webpage 14 of the company 24, in order for facilitate serving of the verified testimonial Information 12 (e.g. text and/or image) via the company 24 webpage when requested by the customer 22 via application 16.

For example, this script can be used as instructions for displaying a web seal 362 to the client (e.g. customer 22 application 16). This will serve up the web seal 362 from the administration system 26, once the company website 14 is accessed (e.g. clicked on) by the customer 22, in response to a request for product information. However, another version of the service may allow the customer 22 to access the web seal 362 and simply link to a page of the website 15 hosted by the administration system 26, which includes the verified testimonial information 12 of the company 24. Accordingly, the web seal 362 can be shown on the customer's 22 browser which they can click or the company 24 can download the web seal 362 and upload it to their site which is then hyperlinked to a page on the testimonial administration system 26 server which shows the verified testimonial information 12. The script may also display the actual verified testimonial information 12 on the company's 24 website 14 instead of just the web seal 362, as desired. It is also recognised that interaction between the web seal 362 and the customer 22 can be used to track the interest in and/or sale of the associated company 24 products by the customer 22, as desired.

Accordingly, the web seal 362 can be used as a link to access the associated verified testimonial information 12 (and/or additional testimonial information 13), and/or it can be used to provide proof to the customer 22 of the veracity of the testimonial Information 12. Further, the web seal 362 can be displayed in conjunction with the testimonial information 12,13 or supplied to the customer 22 when interacting with the testimonial information 12,13. For example, the web seal 362 can be displayed to the customer 22 in connection with a mouse-over (passive user event) of the testimonial information 12,13 by the customer 22, or can be displayed to the customer 22 in connection with a mouse click (active user event) on the testimonial information 12,13 by the customer 22.

Examples of the web seals 362 are shown in FIGS. 9 and 10, including different categories that can signify different levels of verification (e.g. automated vs. manual verification procedures for selected verification steps, etc.). Web seal 366 demonstrates a sample customer service seal, where similar ones can be generated for specific company 24 products (e.g. goods and/or services). Web seal 368 demonstrates a Private Label web seal (e.g. where verification services of the testimonial data 301 are provided by a third party verification process), Web seal 370 demonstrates a Platinum Verified Testimonial information 12 (for example) that indicates a defined level of verification.

Alternatively, or in addition, the verified testimonial information 12 may be presented in a message format (e.g. email) to the customer 22 either synchronously or asynchronously as desired. The message may be sent by the testimonial server module 306 In any suitable way over the network 11—e.g., to a PDA, to a cellular phone via SMS, or to an e-mail address, for example. The verified testimonial information 12 is presented so that the customer 22 (e.g., a visitor to a website, or a recipient of a message including the testimonial) has access to at least a portion of the verified data 301,302,320 stored in the memory 308. It is also recognised that the testimonial information 12 can be sent to the customer 22 via the message (e.g. email and/or voice) which also invites the customer to visit a certain store (physical and/or virtual—e.g. website 14) for further experiences with the company 24 and the company's product(s), as desired. It is also recognised that the company 24 can place a hyperlink in their emails to a page on administrator's server website 15 which hosts the verified testimonial information 12.

It is also recognised that the messages, containing the verified testimonial information 12,13 could be sent to the customer 22 as a result of the customer showing interest/purchase in the company's 24 products. For example, the customer 22 can view product(s) without purchasing (e.g. via visiting either a physical or virtual company 24 store) on a first visit, which is then followed up by verified testimonial information 12 on the viewed product(s) (or others) sent via message (e.g. email, phone) to the customer 22 by the testimonial server module 306. In this case the testimonial server module 306 would have access (e.g. via the memory 308) to collected details of the customer 22 visit and suitable customer 22 contact information. It is also recognised that similar messages could be sent to the customer 22 in association with product(s) purchased by the customer 22 (or by friends/relatives of the customer) from the company 24 or by any third party companies 24 that have a relationship with the company 24 experienced by the customer 22.

Once the company data 302 and the testimonial data 301 for one or more testimonials have been verified, the system 26 preferably provides confirmation of verification to the customer 22 in a number of different modes. In a first mode, the testimonial-serving module 306 can serve up the testimonial information 12 directly onto the web pages 14 of the appropriate company 24. When so provided, the testimonial information 12 can include a statement indicating that the testimonial information 12 is provided directly by the administrator system 26. The testimonial information 12 may also include third party advertising messages when displayed. In a second mode of operation, a graphical image (e.g. web seal 362—see FIG. 9) can be displayed on the website of the company 24 indicating that the testimonial information 12 has been verified by the administrator system 26 (note that when the web seal 362 is clicked the customer 22 is provided with the verified testimonial information(s) 12). It is recognised that a similar procedure for inclusion of the testimonial information 12 and/or the web seals 362 could also be followed for the communication of messages (e.g. email) to the customer 22, as specified by the company 24. It is recognised that other modes of operation can be used, as desired.

Proof Presentation Module 310

The system 26 also has the proof presentation module 310 for providing the customer 22 with access to the verified testimonial data 301 and company data 302 as additional testimonial information 13 that is related to the verified testimonial information 12. It is recognised that the additional information 13 can include details not included in the verified testimonial information 12, for example information such as but not limited to: the website owner's website (URL, site description, etc.); additional testimony provided; the name, address, phone number, occupation, and/or email address of the testimonial provider 20 who provided the testimony; whether or not the goods and/or services were purchased (and if so, optionally the date of purchase and/or scanned image of the invoice or receipt); any special relationship between the company 24 and the testimonial provider 20 (e.g., relative, shareholder, partner company, etc.); and the date of verification completion (e.g. for each verification step) as well as other verification information 320. The extent of the verification data 320 provided is subject to agreement between the company 24 and the administration system 26, as desired. Further, if the company's 24 position on any particular issue related to content provided by the administration system 26 is unacceptable to the administration system 26, then the relationship between the company 24 and the administration system 26 can be terminated, in accordance with the written contract between the parties.

The proof presentation module 310 can provide confirmation of verification of the verified testimonial information 12 to the customer 22 in a number of different modes, as desired. Accordingly, referring to FIG. 10, a visitor (the customer 22) to the website 14 of the company 24 (for example) can click on the actual testimonial information 12 (in a first mode), the graphical image/web seal 370 (in a second mode), or a predefined proof link 372 (in a third mode) to be taken to the website 15 associated with the administrator system 26. The click (and/or impressions or other customer 22 data useful in tracking customer 22 interaction with the testimonial information 12,13 and web seals 362) will be tracked (further described below) by the payment module 312 to have originated from the particular website owner's site (e.g. company 24 associated with the products). The visitor will also be communicated the additional information 13 (e.g. in the same or new browser window and/or as a message such as email), using the proof presentation module 310, as all or a subset of the information data 301,302,320 that was collected and verified for both the company 24 and/or the testimonial provider(s) 20. An example of this additional testimonial information 13 is shown in FIG. 7.

Accordingly, the proof presentation module 310 of the administration system 26 can generate and communicate the additional information 13, on the selected website 14,15 and/or message, as the verified evidence of the authenticity of one or more testimonial 12 provided for the goods and/or services (products) offered by the company 24 (e.g. at the company 24 website).

It is also considered that implementation of the modules 306,310 could be combined as a common module for facilitating access to the testimonial information 12 as well as to access to the additional information 13 for supplying further verified evidence of the testimonial information 12, for example.

Payment Module 312

Referring to FIG. 3, the payment module 312 coordinates payment by the respective company 24 (or associated company) for the services of the administration system 26. For example, the payment module 312 coordinates billing of the website 14 owner, and collecting amounts owing from the website 14 owner. Preferably, the company 24 (e.g. website 14 owner) is issued an invoice, requesting payment to the administration system 26, for services (e.g. providing the information 12,13) provided by the administration system 26. For example, the administration system 26 charges a fee for setting up an account for a particular company 24. Also, the company 24 can be charged for each testimonial 12 which the administration system 26 verifies, or a monthly subscription fee as desired. Also, for each visitor (e.g. customer 22) to the website 14,15 who accesses the information 12,13, the company 24 can pay a predetermined fee (e.g. for both impressions and clicks are billable). Alternatively, if the information 12,13 is presented in a message, the company may be billed a certain amount for each recipient of the message. For example, the billing may be based on recipients who viewed/listened to the message. The company 24 can be billed on an agreed-upon basis (e.g., monthly, quarterly, annually etc.) for the services provided by the administration system 26.

It is understood that clicks can define the customer 24 clicks (active interaction) on the web seal 362 and/or testimonial information 12,13, and impressions can define the number of times the web seal 362 and/or testimonial information 12,13 is visited (passive interaction) by the customer 24. For example, Click through Rate can define the web seal 362 and/or testimonial information 12,13 Click through rate (CTR) as the number of clicks by the customer 24 the web seal 362 and/or testimonial information 12,13 receives divided by the number of times the web seal 362 and/or testimonial information 12,13 is shown (e.g. impressions)

Referring again to FIG. 3, the proof module (or an additional/other module—not shown) 310 can also function as a search engine for searching a testimonial database 25, in the memory 308 of the administration system 26, for particular testimonial information 12 that matches a search query 17. Results to the query 17 are provided back to the customer including the testimonial information 12 (and additional information 13 as desired) matching the query 17. The query 17 can include search terms such as but not limited to: specified company(s); specified product(s) (e.g. rogaine); specified testimonial provider(s); and website 14 category (e.g. health and wellness) among others. For example, this way the customer 22 can find a trusted site 14 on which to purchase rogaine. If the trusted site 14 has an affiliate program, the customer 22 can be directed to the company 24 (the affiliate site will be the administrator's site in this case), site 14 using the affiliate link for that site provided in the testimonial information 12, for example. However, if the trusted site 14 doesn't have an affiliate program, the customer 22 can be directed to the trusted site 14 with a regular link provided in the testimonial information 12, for example. The search query 17 can also contain data suitable for an advanced search, by which the customer 22 can search by any combination of the data 301,302 collected and verified (e.g. company name, city etc), number of testimonials verified, verification date of last verified testimonial, etc.

Further, it is recognised that a visitor to the site 15 associated with the administration system 26 will also be able to browse categorically (or otherwise) a list of sites 14 which have utilized the testimonial verification services and click to be redirected to an appropriate site 14, as desired.

Figure 11:
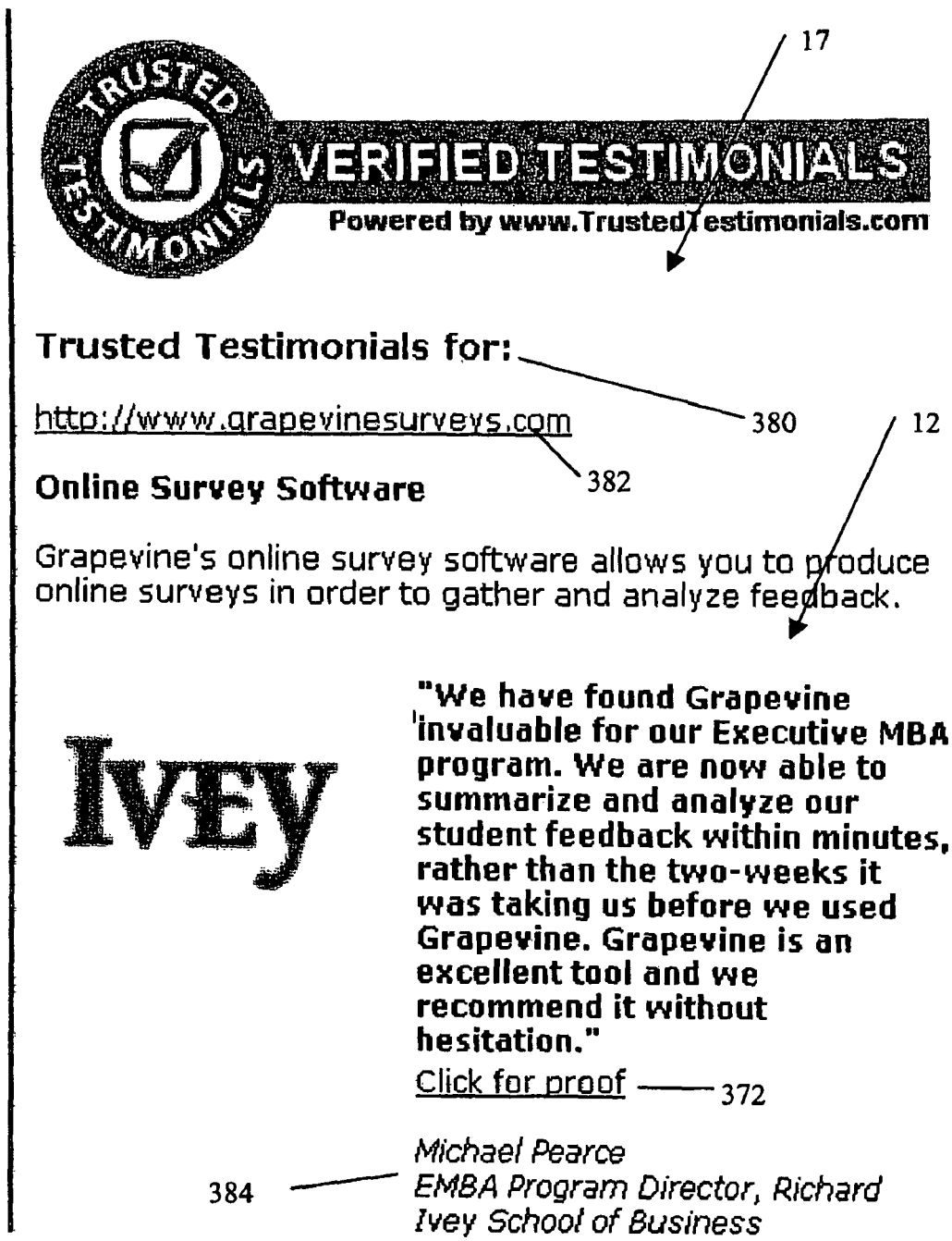
FIG. 11 shows an example search result of the proof module of FIG. 3.

Referring to FIG. 11, shown Is a search query 17 result including the company name 380 searched including a link 382 to the company 24 site 15, company data 302, testimonial provider 20 identification data 384, a list of the applicable verified testimonials 12 (the searcher can scroll down to see more verified testimonials 12), and the proof link 372, for example.

Operation of the System 10

Figure 12:
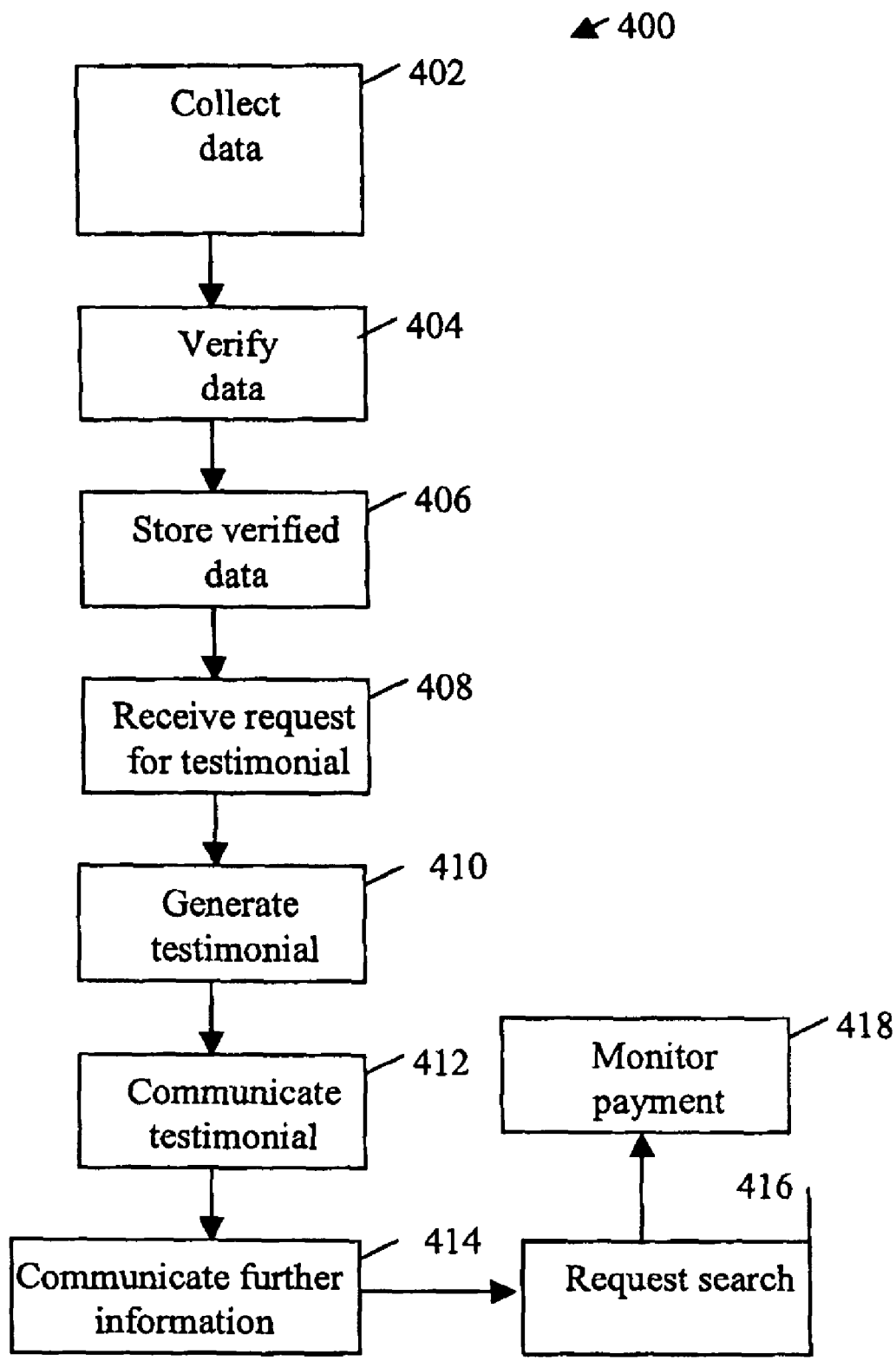
FIG. 12 is a flowchart of operation of the system of FIG. 1.

Referring to FIG. 12, a method 400 for providing verified testimonial information of the company 24 product for access by the customer 22 over the communications network 11 is shown, such that the verified testimonial information 12 is configured for affirming desirability of the product by one or more customers 22. The first step is to receive or otherwise collect 402 the data 310,302,322 via the collection module 300 (for example). Part of the data collection methodology could be to register the company 24 and/or the testimonial provider 20 with the administration system 26, as desired. A second step is to confirm 404 the authenticity of the data 301,302 for inclusion in the verified testimonial information 12, once generated. This step could include contacting the testimonial provider 20 in confirmation of the authenticity of at least the origin of the testimonial data 301. The next step is to store 406 the verified data 301,302,322 in the memory 308.

The next step is to receive 408 a request for the verified testimonial information 12, such that the request would include identifying one or both of a company name (or other company identification—e.g. geographic region, company type, etc.) related to the product or the product (e.g. name or other product identification Information). The next step is to generate 410 the verified testimonial information 12 to include the testimonial data and an identification portion 322 identifying the verified authenticity of the testimonial data 301. It is recognised that this step could include restricting the amount of the testimonial data 301 included in the verified testimonial information 12 as a first portion of the testimonial data. Further, it is recognised that this step could include including a temporal indication in the identification portion 322, the temporal indication for indicating at least a date of generation for one or both of the identification portion 322 and the verified testimonial information 12. The next step is to communicate 412 the verified testimonial information 12 over the network 11 in response to the received request.

It is recognised that another step of the method 400 could be communicating 414 further information in response to customer 22 interaction with the verified testimonial information 12, the further information such as but not limited to a second subset of the testimonial data (e.g. further testimonial information 13) and a web seal 362 (e.g. a graphical image; an audio segment; or a video segment), a desired. It is recognised that another step of the method 400 could be requesting 416 from a search engine to identify testimonial data 301 entries in a list (e.g. in the memory 308) matching at least one of the parameters of the request, such that the response to the request includes a list of matched companies 24 and/or product names. It is recognised that another step of the method 400 could be monitoring 418 interaction by the customer 22 with the verified testimonial information 12,13 (and/or web seals 362) for facilitating collection of respective payment from the company 24 associated with the company product.

It will be appreciated by those skilled in the art that the invention can take many forms, and that such forms are within the scope of the invention as claimed. Therefore, the spirit and scope of the appended claims should not be limited to the description of the preferred versions contained herein,

I claim:

1. A method for providing verified testimonial information of a company product for access by a customer over a communications network, the verified testimonial information configured for affirming desirability of the product by one or more customers, the method comprising the acts of:
   confirming the authenticity of the testimonial data for inclusion in the verified testimonial information;
   receiving at a server computing device a request for the verified testimonial information, the request including identifying at least one of a company name or the product, the company name being related to the product;
   generating the verified testimonial information to include the testimonial data and an identification portion identifying the verified authenticity of the testimonial data; and
   communicating the verified testimonial information in response to the received request.

2. The method of claim 1, wherein the product is selected from the group comprising: goods; and services.

3. The method of claim 2, wherein the verified testimonial information includes the testimonial data collected from at least one testimonial provider, the testimonial data selected from the group comprising: a written statement; a picture; a video statement; an audio statement; and an image provided from a testimonial provider, such that the testimonial data provides for a recommendation in favour of one or both of the product or the company.

4. The method of claim 3, wherein the verified testimonial information is communicated as included in an electronic message addressed to the customer or as included in the content of a webpage requested by the customer.

5. The method of claim 3 further comprising the act of restricting the amount of the testimonial data included in the verified testimonial information as a first portion of the testimonial data.

6. The method of claim 3 further comprising the act of contacting the testimonial provider in confirmation of the authenticity of at least the origin of the testimonial data.

7. The method of claim 6, wherein the contact with the testimonial provider uses a method selected from the group comprising: an electronic message; and a telephone.

8. The method of claim 7 further comprising the act of recording at least one step of the verification process and including the at least one step as part of the testimonial data.

9. The method of claim 3, wherein the identification portion is selected from the group comprising: a statement from a testimonial administration system providing the verified testimonial information; a graphical image; an audio segment; and a video segment.

10. The method of claim 9 further comprising the act of including a temporal indication in the identification portion, the temporal indication for indicating at least a date of generation for one or both of the identification portion and the verified testimonial information.

11. The method of claim 3 further comprising the act of communicating a further identification portion in response to customer interaction with the verified testimonial information, the further identification portion selected from the group comprising: a second subset of the testimonial data; a graphical image; an audio segment; and a video segment.

12. The method of claim 3 further comprising the act of configuring the generated verified testimonial information for sending to a requestor of the request, the requestor selected from the group comprising: the company; and the customer.

13. The method of claim 12, wherein the request is directed to a search engine for identifying testimonial data entries in a list matching at least one of the parameters of the request, such that the response to the request includes a list of matched companies or product names.

14. The method of claim 3 further comprising the act of monitoring interaction by the customer with the verified testimonial information for facilitating collection of respective payment from the company associated with the company product.

15. A system for providing verified testimonial information of a company product for access by a customer over a communications network, the verified testimonial information configured for affirming desirability of the product by one or more customers, the system comprising:
   a verification data module to confirm the authenticity of the testimonial data for inclusion in the verified testimonial information;
   a data module to receive a request for the verified testimonial information, the request including identifying at least one of a company name or the product, the company name being related to the product;
   a testimonial data module to generate the verified testimonial information to include the testimonial data and an identification portion identifying the verified authenticity of the testimonial data; and to communicate the verified testimonial information in response to the received request.

16. The system of claim 15, wherein the verified testimonial information includes the testimonial data collected from at least one testimonial provider, the testimonial data selected from the group comprising: a written statement; a picture; a video statement; an audio statement; and an image provided from a testimonial provider, such that the testimonial data provides for a recommendation in favour of one or both of the product or the company.

17. The system of claim 16, wherein the verified testimonial information is communicated as included in an electronic message addressed to the customer or as included in the content of a webpage requested by the customer.

18. The system of claim 16 further comprising the testimonial data module to restrict the amount of the testimonial data included in the verified testimonial information as a first portion of the testimonial data.

19. The system of claim 16 further comprising the verification data module to contact the testimonial provider in confirmation of the authenticity of at least the origin of the testimonial data.

20. The system of claim 19, wherein the contact with the testimonial provider uses a method selected from the group comprising: an electronic message; and a telephone.

21. The system of claim 20 further comprising the verification data module to record at least one step of the verification process and including the at least one step as part of the testimonial data.

22. The system of claim 16 further comprising a proof data module to communicate a further identification portion in response to customer interaction with the verified testimonial information, the further identification portion selected from the group comprising: a second subset of the testimonial data; a graphical image; an audio segment; and a video segment.

23. The system of claim 22, wherein the proof data module is configured to operate as a search engine for identifying testimonial data entries in a list matching at least one of the parameters of the request, such that the response to the request includes a list of matched companies or product names.

24. The system of claim 16 further comprising a payment data module to monitor interaction by the customer with the verified testimonial information for facilitating collection of respective payment from the company associated with the company product.

25. A computer program product including instructions stored thereon for providing verified testimonial information of a company product for access by a customer over a communications network, when the instructions are executed by a computer processor, the verified testimonial information configured for affirming desirability of the product by one or more customers, the computer program product comprising:
  a verification module stored on the computer readable medium for confirming the authenticity of the testimonial data for inclusion in the verified testimonial information;
  a data module stored on the computer readable medium for receiving a request for the verified testimonial information, the request including identifying at least one of a company name or the product, the company name being related to the product;
  a testimonial module stored on the computer readable medium for generating the verified testimonial information to include the testimonial data and an identification portion identifying the verified authenticity of the testimonial data; and for communicating the verified testimonial information in response to the received request.

* * * * *